(12) United States Patent
Bhat et al.

(10) Patent No.: US 12,579,166 B1
(45) Date of Patent: Mar. 17, 2026

(54) ACTIVE-ACTIVE MIRRORED ARTIFICIAL INTELLIGENCE ARCHITECTURE

(71) Applicant: Citibank, N.A., New York, NY (US)

(72) Inventors: Ganesh Prasad Bhat, West Orange, NJ (US); James Randolph Myers, Clearwater Beach, FL (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/376,656

(22) Filed: Oct. 31, 2025

(51) Int. Cl.
G06F 16/907 (2019.01)
G06F 16/27 (2019.01)

(52) U.S. Cl.
CPC .......... G06F 16/273 (2019.01); G06F 16/907 (2019.01)

(58) Field of Classification Search
CPC ...................................................... G06F 16/907
See application file for complete search history.

(56) References Cited

U.S. PATENT DOCUMENTS

| | | | | |
|---|---|---|---|---|
| 11,422,731 | B1 * | 8/2022 | Potashnik | G06F 11/1469 |
| 12,307,299 | B1 * | 5/2025 | Elbadrashiny | G06F 9/5038 |
| 2017/0212948 | A1 * | 7/2017 | Wang | G06F 16/285 |
| 2018/0356989 | A1 * | 12/2018 | Meister | G06F 3/062 |
| 2020/0051550 | A1 * | 2/2020 | Baker | G10L 21/00 |
| 2025/0307927 | A1 * | 10/2025 | Galvin | G06N 3/045 |

OTHER PUBLICATIONS

Shaikat Biswas 2025. Artificial IntelligenceăEnhanced Cybersecurity Frameworks for Real-Time Threat Detection in Cloud and Enterprise. ASRC Procedia: Global Perspectives in Science and Scholarship. 1, 01 (Apr. 2025), 737-770. (Year: 2025).*
Govindarajulunaidu Sambath Narayanan, D.B. 2025. Enhancing Data Quality and Consistency in Large-Scale Analytical Systems through AI-Driven Engineering Workflows. International Journal of Emerging Trends in Computer Science and Information Technology. 6, 3 (Sep. 2025), 85-93. (Year: 2025).*
James Cipar, Greg Ganger, Kimberly Keeton, Charles B. Morrey, et al. 2012. LazyBase: trading freshness for performance in a scalable database. In Proceedings of the 7th ACM european conference on Computer Systems (EuroSys '12). Association for Computing Machinery, New York, NY, USA, 169-182. (Year: 2012).*

* cited by examiner

*Primary Examiner* — Kris E Mackes
(74) *Attorney, Agent, or Firm* — Perkins Coie LLP

(57) ABSTRACT

Systems and methods for an active-active mirrored artificial intelligence architecture are disclosed. In some implementations, the system identifies, for an inference request from a user, at least two geographically separate compute clusters configured to handle the inference request, each compute cluster storing a version of an artificial intelligence model for processing the inference request. The system determines, from the inference request, a data consistency requirement mapping the inference request to one or more data consistency types. The system determines, for each compute cluster, a composite metric based on, among other things, a consistency freshness score of the compute cluster. The system routes the inference request to a selected compute cluster having a lowest composite metric subject to a constraint that the consistency freshness score for the compute cluster satisfies the data consistency requirement for the inference request. The system returns an inference response for the inference request to the user.

20 Claims, 10 Drawing Sheets

300

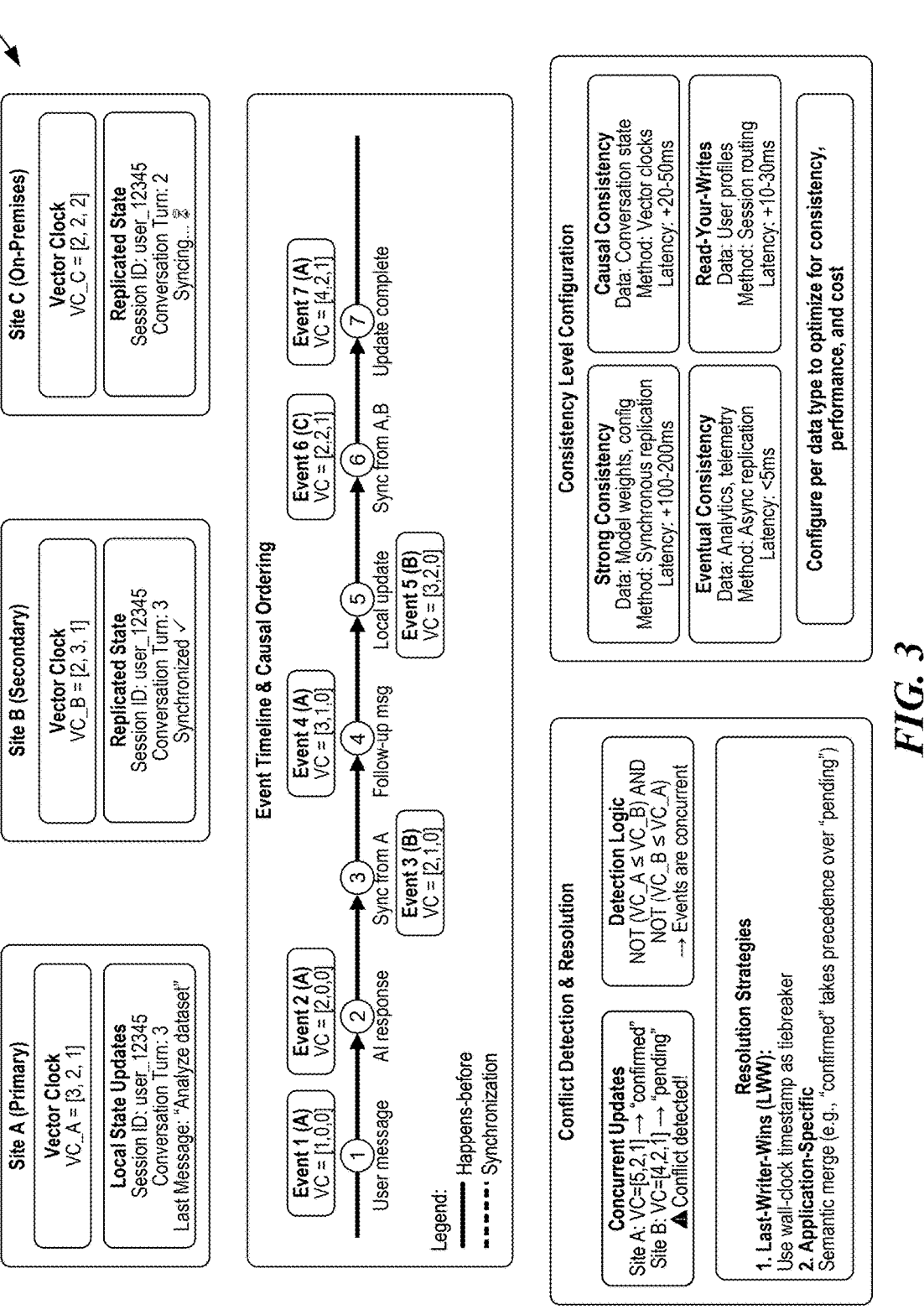

Site A (Primary)

Vector Clock
VC_A = [3, 2, 1]

Local State Updates
Session ID: user_12345
Conversation Turn: 3
Last Message: "Analyze dataset"

Site B (Secondary)

Vector Clock
VC_B = [2, 3, 1]

Replicated State
Session ID: user_12345
Conversation Turn: 3
Synchronized ✓

Site C (On-Premises)

Vector Clock
VC_C = [2, 2, 2]

Replicated State
Session ID: user_12345
Conversation Turn: 2
Syncing... ⟳

Event Timeline & Causal Ordering

Event 1 (A)
VC = [1,0,0]
① User message

Event 2 (A)
VC = [2,0,0]
② AI response

Event 3 (B)
VC = [2,1,0]
③ Sync from A

Event 4 (A)
VC = [3,1,0]
④ Follow-up msg

Event 5 (B)
VC = [3,2,0]
⑤ Local update

Event 6 (C)
VC = [2,2,1]
⑥ Sync from A,B

Event 7 (A)
VC = [4,2,1]
⑦ Update complete

Legend:
——— Happens-before
---- Synchronization

Conflict Detection & Resolution

Concurrent Updates
Site A: VC=[5,2,1] → "confirmed"
Site B: VC=[4,2,1] → "pending"
▲ Conflict detected!

Detection Logic
NOT (VC_A ≤ VC_B) AND
NOT (VC_B ≤ VC_A)
→ Events are concurrent

Resolution Strategies
1. Last-Writer-Wins (LWW):
Use wall-clock timestamp as tiebreaker
2. Application-Specific
Semantic merge (e.g., "confirmed" takes precedence over "pending")

Consistency Level Configuration

Strong Consistency
Data: Model weights, config
Method: Synchronous replication
Latency: +100-200ms

Causal Consistency
Data: Conversation state
Method: Vector clocks
Latency: +20-50ms

Eventual Consistency
Data: Analytics, telemetry
Method: Async replication
Latency: <5ms

Read-Your-Writes
Data: User profiles
Method: Session routing
Latency: +10-30ms

*Configure per data type to optimize for consistency, performance, and cost*

Health Monitoring & Metrics Collection

Infrastructure
• CPU: 65%
• GPU: 72%
• Memory: 56%

Application
• Error Rate: 0.3%
• P95 Latency: 120ms
• Throughput: 45K/s

Synthetic Tests
• Pass Rate: 96%
• Response Time: 95ms
• Correctness: 100%

Predictive
• Anomaly Score: 0.15
• Failure Risk: Low
• Trend: Stable

Health Score
92
HEALTHY

Multi-Site Health Dashboard

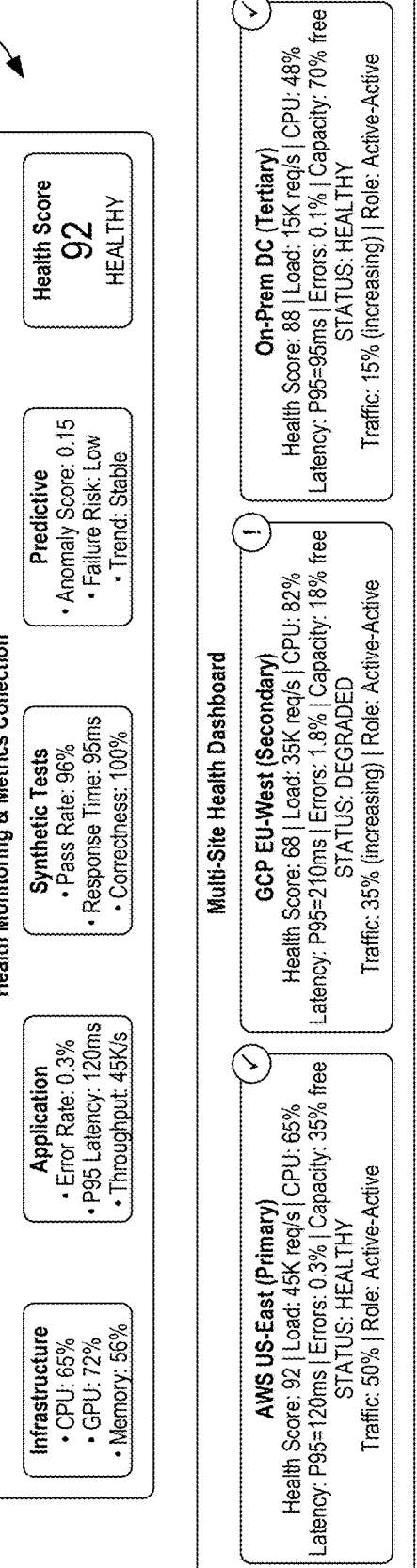

AWS US-East (Primary)
Health Score: 92 | Load: 45K req/s | CPU: 65%
Latency: P95=120ms | Errors: 0.3% | Capacity: 35% free
STATUS: HEALTHY
Traffic: 50% | Role: Active-Active

GCP EU-West (Secondary)
Health Score: 68 | Load: 35K req/s | CPU: 82%
Latency: P95=210ms | Errors: 1.8% | Capacity: 18% free
STATUS: DEGRADED
Traffic: 35% (increasing) | Role: Active-Active

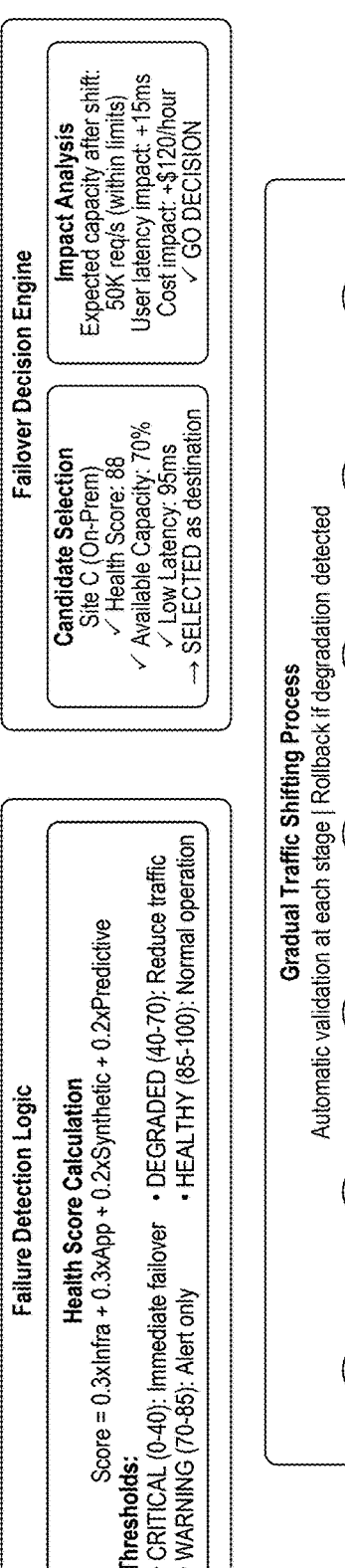

On-Prem DC (Tertiary)
Health Score: 88 | Load: 15K req/s | CPU: 48%
Latency: P95=95ms | Errors: 0.1% | Capacity: 70% free
STATUS: HEALTHY
Traffic: 15% (increasing) | Role: Active-Active

Failure Detection Logic

Health Score Calculation

Score = 0.3xInfra + 0.3xApp + 0.2xSynthetic + 0.2xPredictive

Thresholds:
• CRITICAL (0-40): Immediate failover  • DEGRADED (40-70): Reduce traffic
• WARNING (70-85): Alert only  • HEALTHY (85-100): Normal operation

Failover Decision Engine

Candidate Selection
Site C (On-Prem)
✓ Health Score: 88
✓ Available Capacity: 70%
✓ Low Latency: 95ms
→ SELECTED as destination

Impact Analysis
Expected capacity after shift:
50K req/s (within limits)
User latency impact: +15ms
Cost impact: +$120/hour
✓ GO DECISION

Gradual Traffic Shifting Process

Automatic validation at each stage | Rollback if degradation detected

0% — 10% — 25% — 50% — 75% — 90% — 100%

| T+0s Preparation Site B→C | T+30s Initial Shift ✓ Validated | T+60s Ramp up ✓ Validated | T+90s Half shifted ✓ Validated | T+120s Major shift ✓ Validated | T+150s Near complete ✓ Validated | T+180s COMPLETE ✓ Stable |

*FIG. 4*

600

Identify a contingency graph that links an agent issuing an agent request with a plurality of compute clusters including a primary compute cluster executing the agent request and a mirrored compute cluster, each compute cluster hosting a version of a machine learning model and an agent state, the contingency graph further including a security context for the agent  602

Generate a disruption score for the primary compute cluster based on infrastructure telemetry, application metrics, security events, and/or predictive analytics associated with the agent request  604

Responsive to the disruption score satisfying a condition, transfer, to the mirrored compute cluster, control of the agent and the agent state tied to the agent request, the transfer being executed over a cryptographically authenticated channel associated with the security context for the agent  606

Direct execution of the agent request from the mirrored compute cluster using the security context for the agent such that the agent state remains encrypted in transit and at rest  608

*FIG. 6*

ACTIVE-ACTIVE MIRRORED ARTIFICIAL INTELLIGENCE ARCHITECTURE

BACKGROUND

The rapid advancement of artificial intelligence and machine learning technologies has led to the widespread deployment of artificial intelligence models, including machine learning models and large-language models (LLMs), across diverse industries, including finance, healthcare, customer service, and enterprise automation. These models are increasingly relied upon to deliver real-time inference, support complex decision-making, and enable dynamic conversational interfaces. As organizations scale their AI infrastructure, the need for robust, high-availability architectures and seamless data management across distributed environments has become paramount.

Modern cloud computing platforms and hybrid multi-cloud deployments present unique challenges in maintaining service continuity, data integrity, and operational resilience. Factors such as network latency, infrastructure failures, and dynamic workload fluctuations can impact the reliability and performance of AI-driven systems. Consequently, there is a growing demand for solutions that can ensure uninterrupted service, consistent data handling, and secure execution of critical workflows in the face of both anticipated and unforeseen disruptions.

BRIEF DESCRIPTION OF THE DRAWINGS

FIG. 3 is a block diagram showing a state consistency framework including a vector clock-based state synchronization protocol showing causal ordering and conflict resolution in accordance with some implementations of the present technology.

FIG. 4 is a block diagram showing an automatic failover system including health monitoring, failure detection, and intelligent traffic shifting mechanisms in accordance with some implementations of the present technology.

FIG. 6 is a flow diagram illustrating an example process for dynamic agentic disruption processing by the disclosed system in some implementations of the present technology.

Figure 1:
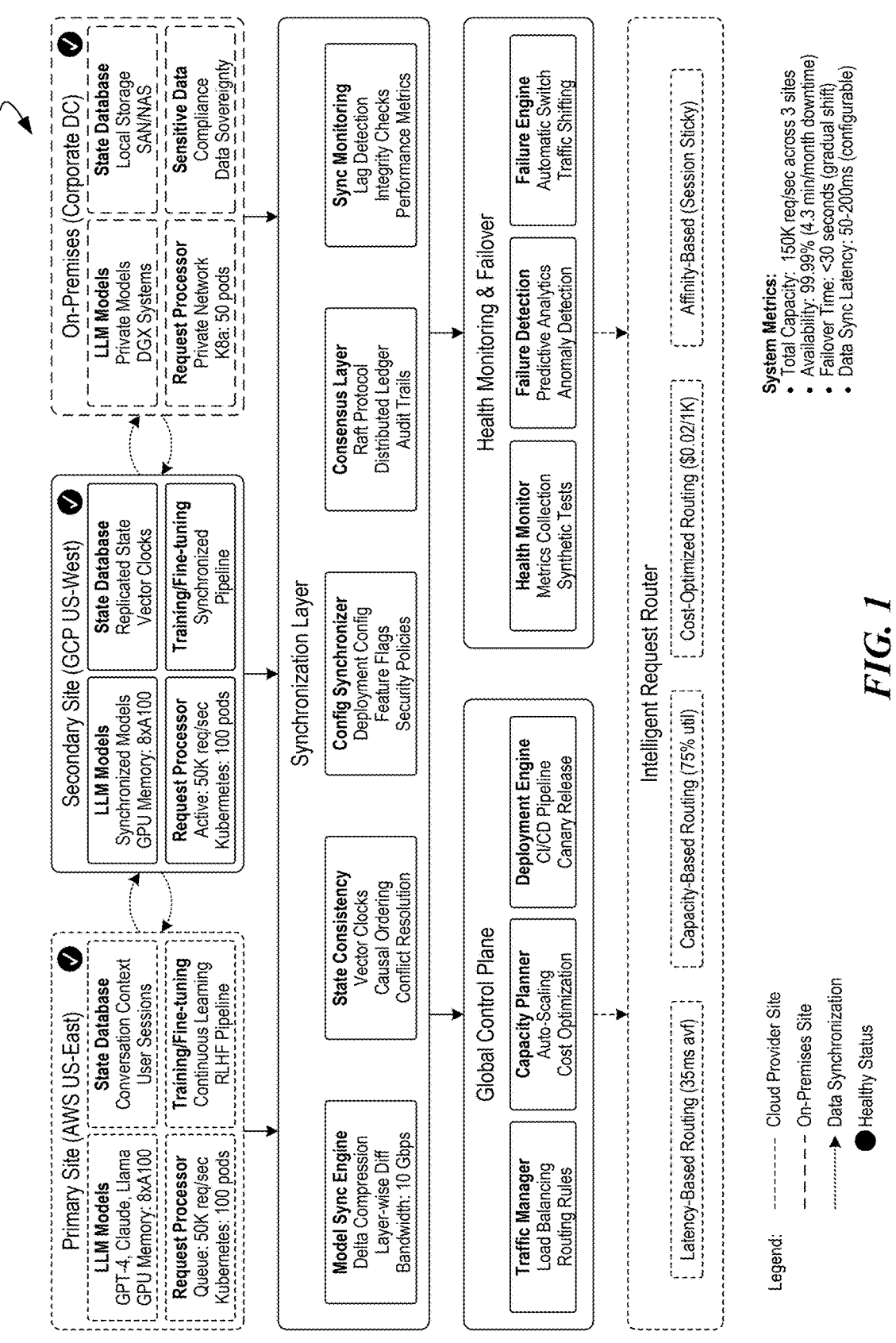
FIG. 1 is a block diagram showing system architecture for a resilient mirrored artificial intelligence infrastructure including at least some components across hybrid deployment environments in accordance with some implementations of the present technology.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Current approaches to AI infrastructure resilience face several significant limitations that hinder the reliability, efficiency, and scalability of artificial intelligence model deployments. One prevalent strategy includes the use of active-passive architectures for disaster recovery. In these configurations, a primary system handles all operational workloads while a secondary, standby system remains idle until a failure is detected. This design leads to substantial underutilization of computational resources during normal operations, as the passive system does not contribute to workload processing. Furthermore, the transition from passive to active status in the event of a failure typically involves lengthy recovery time objectives (RTO), often measured in minutes or even hours. The failover process itself is complex, requiring intricate state transfer mechanisms to synchronize data and operational context, which can result in partial or complete data loss during the transition period.

Another limitation arises from the stateless assumptions embedded in many AI deployment frameworks. These systems are often designed to treat each inference or training request as an isolated transaction, without maintaining persistent state or context across sessions. As a result, when failures occur, any ongoing conversation context, in-flight training, or fine-tuning operations are lost. This inability to preserve user session information or intermediate model states leads to a degraded user experience following recovery, e.g., a loss of outputs including intermediate artifacts, as users may be forced to restart interactions or repeat previously completed steps, e.g., configuring prompts and uploading reference documents. The lack of stateful continuity also impedes the implementation of advanced features such as personalized recommendations, adaptive learning, and seamless multi-turn dialogues.

The reliance on single-cloud deployments further exacerbates the limitations of current AI infrastructure. Organizations frequently choose to host their models and data within a single cloud provider, which introduces significant vendor lock-in and concentration risk. In the event of a provider-wide outage or service degradation, all dependent AI services may become unavailable, resulting in widespread disruption. Single-cloud architectures also restrict geographic diversity, limiting the ability to optimize for latency, redundancy, and compliance with regional data sovereignty regulations. This lack of flexibility can pose substantial challenges for organizations operating in multiple jurisdictions or seeking to meet evolving regulatory requirements.

Additionally, existing systems often struggle to balance the competing demands of consistency, availability, and performance in distributed environments. Many architectures prioritize either strong consistency, which can introduce latency and reduce throughput, or eventual consistency, which may allow for temporary data divergence and may complicate recovery processes. The absence of adaptive consistency models tailored to the specific needs of different data categories, such as model weights, user sessions, and telemetry, limits the ability to optimize both reliability and efficiency. This rigidity can result in suboptimal resource utilization and increased risk of data inconsistency during failover or recovery events.

Security and auditability also present ongoing challenges for current AI infrastructure solutions. The process of transferring state and operational control between environments during failover is frequently executed over channels that lack robust cryptographic authentication and end-to-end encryption. This exposes sensitive data to potential interception, tampering, or unauthorized access, particularly in multi-tenant or cross-cloud scenarios. Furthermore, the absence of immutable audit trails for model updates, failover events, and state transfers impedes forensic analysis and regulatory compliance, making it difficult to verify the integrity and provenance of critical AI operations. Collectively, these limitations underscore the need for more resilient, stateful, multi-cloud, and security-conscious approaches to AI infrastructure design.

Artificial intelligence systems, and particularly those employing large language models (LLMs), present a set of unique challenges that render traditional disaster recovery and high-availability approaches inadequate. Unlike conventional web services or database-driven applications, LLMs are characterized by their immense scale, complex statefulness, and continuous evolution. These factors introduce significant technical hurdles in ensuring service continuity, data integrity, and operational resilience in the face of infrastructure failures or disruptions.

Modern LLMs routinely contain billions, and in some cases, over a trillion parameters. The sheer size of these models results in model files that can reach hundreds of gigabytes or more. Traditional database replication techniques, which are designed for relatively small and structured datasets, are insufficient for the efficient synchronization of such massive neural network weights. The volume and complexity of the data involved necessitate specialized replication mechanisms that can operate at scale without incurring prohibitive latency or bandwidth costs.

In contrast to stateless web services, AI agents powered by LLMs maintain rich, multi-turn conversation context, user preferences, intermediate reasoning states, and memory of previous interactions. This statefulness is essential for delivering personalized, coherent, and context-aware responses to users. However, it also complicates disaster recovery, as the loss of state during a failover event can result in degraded user experience, loss of session continuity, and interruption of ongoing tasks. Preserving this state across distributed environments is a non-trivial challenge that requires robust consistency and synchronization frameworks.

Organizations are increasingly engaged in the continuous improvement of their deployed models through ongoing fine-tuning operations, incremental learning from user interactions, domain-specific adaptations, and reinforcement learning from human feedback (RLHF). These dynamic updates introduce additional complexity, as the model parameters and associated metadata are in a constant state of flux. Ensuring that all replicas of a model remain synchronized and up-to-date, even as training and adaptation occur in real time, is critical for maintaining the integrity and reliability of AI services.

Real-time AI applications impose stringent requirements for sub-second response times and consistent performance characteristics. Redundancy mechanisms, such as replication and failover, must be implemented in a manner that introduces minimal overhead and does not compromise the responsiveness of the system. Achieving this balance between resilience and performance is particularly challenging in distributed environments, where network latency, bandwidth constraints, and infrastructure heterogeneity can impact the efficiency of synchronization and failover operations.

In some aspects, the systems and methods described herein address these challenges by providing a resilient, active-active mirrored AI infrastructure that ensures continuity through intelligent synchronization and automatic failover. This architecture enables organizations to deploy AI services across multiple geographic locations and infrastructure providers, thereby enhancing availability, fault tolerance, and compliance with data sovereignty requirements. The solution is designed to maintain consistency, performance, and cost efficiency, even in the face of large-scale disruptions or ongoing model evolution.

In some implementations, the solution includes a Model Synchronization Engine that can replicate large language models and specialized AI models across multiple sites. This engine leverages novel delta-compression algorithms optimized for neural network weights, enabling the transmission of only the differences between model versions rather than entire model files. The engine implements layer-wise differential synchronization, hierarchical compression, priority-based synchronization, bandwidth-adaptive protocols, and multi-level check summing and verification. These features collectively reduce the time and resources required for model replication, while ensuring the integrity and consistency of model data across distributed environments.

In some implementations, to address the challenge of stateful continuity, the solution includes a State Consistency Framework that can employ a hybrid approach combining vector clocks, distributed consensus mechanisms, and eventual consistency patterns. This framework can maintain consistency across a wide range of data types, including conversation context, user session data, in-flight training operations, model version metadata, and request queues. By dynamically selecting the appropriate consistency protocol for each data category, the framework optimizes both reliability and performance, ensuring seamless user experiences and robust disaster recovery.

In some implementations, the solution includes an Automatic Failover System that can continuously monitor infrastructure health across all sites, utilizing multi-dimensional health metrics and predictive failure detection algorithms. In the event of a detected anomaly or degradation, the system performs intelligent failover decisions, gradually shifting traffic to healthy environments while supporting automatic rollback capabilities and cascading failure prevention. This proactive approach minimizes service disruption, reduces recovery time objectives, and preserves operational continuity for critical AI workflows.

In some implementations, the solution includes a Hybrid Geographic Distribution Manager that can orchestrate AI infrastructure across multiple public cloud providers, private cloud and on-premises data centers, edge locations for latency-sensitive workloads, and geographic regions to meet data sovereignty requirements. This component enables organizations to optimize resource allocation, minimize latency, and comply with regulatory mandates by dynamically distributing workloads and data across a diverse set of infrastructure environments. The combination of these systems and methods provides a comprehensive solution to the unique challenges posed by large language models, delivering resilient, high-performance, and stateful AI services in modern distributed computing landscapes.

In some aspects, the systems and methods described herein provide for an active-active mirrored artificial intelligence architecture. In some implementations, the system identifies, for an inference request from a user, at least two geographically separate compute clusters configured to handle the inference request, each compute cluster storing a version of an artificial intelligence model for processing the inference request. The system determines, from the inference request, a data consistency requirement that maps the inference request to one or more data consistency types. The system determines, for each compute cluster, a composite metric based on, among other things, a consistency freshness score of the compute cluster. The system routes the inference request to a selected compute cluster having a lowest composite metric subject to a constraint that the consistency freshness score for the compute cluster satisfies the data consistency requirement for the inference request. The system returns an inference response for the inference request to the user. The inference response was generated by the selected compute cluster.

The inventors for the active-active mirrored artificial intelligence architecture focused on, among other things, the creation of a novel software system for distributed AI inference. Their objective was to enhance the functionality, performance, and reliability of large-scale artificial intelligence deployments by enabling real-time, geographically distributed processing of inference requests. The system was designed to intelligently route user requests to the optimal compute cluster based on a composite metric that incorporates data consistency requirements and freshness scores, thereby improving the quality and responsiveness of AI services. These advancements contribute to the development of a robust and scalable AI infrastructure platform capable of supporting mission-critical applications with higher availability and lower latency.

The inventors relied on principles of computer science and engineering, including distributed systems design, data consistency models, and advanced algorithm development. The inventors leveraged, among other things, consistency protocols (e.g., strong, eventual, and causal consistency), distributed consensus mechanisms, and real-time metric computation. The inventors employed engineering principles to architect the system for fault tolerance, scalability, and efficient resource utilization across multiple geographic locations. The technical challenges addressed were deeply rooted in the fields of software engineering and distributed computing, and the solutions developed were based on rigorous scientific and technological methodologies.

At the outset, there was significant technical uncertainty regarding suitable design and implementation of a system capable of dynamically routing AI inference requests across multiple compute clusters while satisfying varying data consistency requirements. Uncertainty existed as to whether it was feasible to maintain consistency freshness and performance across geographically separated clusters, how to compute and balance composite metrics in real time, and how to ensure that the system could reliably return accurate inference responses under diverse operational conditions. The inventors faced unknowns related to, among other things, the scalability of the architecture, the effectiveness of different consistency protocols, and the integration of real-time monitoring and decision-making algorithms.

To resolve these technical uncertainties, the inventors employed a systematic process of experimentation that included iterative prototyping, simulation, and real-world testing. Multiple architectural alternatives were evaluated through modeling and simulation to assess their impact on consistency, latency, and reliability. The inventors conducted trial-and-error experiments with various data consistency protocols and composite metric formulations, analyzing system behavior under varying workloads. This rigorous process of experimentation enabled the inventors to identify and implement an effective solution, culminating in a robust active-active mirrored AI architecture.

In some aspects, the systems and methods described herein provide for dynamic agentic disruption processing. In some implementations, the system identifies a contingency graph that links an agent issuing an agent request with a plurality of compute clusters including a primary compute cluster executing the agent request and a mirrored compute cluster. The system generates a disruption score for the primary compute cluster based on information associated with the agent request. The system, responsive to the disruption score satisfying a condition, transfers to the mirrored compute cluster control of the agent and the agent state tied to the agent request. The system directs execution of the agent request from the mirrored compute cluster using the security context for the agent such that the agent state remains encrypted in transit and at rest.

For dynamic agentic disruption processing, the inventors focused on developing and improving, among other things, an advanced software system for resilient AI agent orchestration. Their objective was to enhance the reliability, security, and continuity of agent-driven workflows by enabling automatic detection and mitigation of infrastructure disruptions. The system was designed to dynamically transfer control and state of AI agents between compute clusters in response to real-time disruption scores, ensuring uninterrupted execution of agent requests and maintaining end-to-end security. These improvements directly address the need for robust, high-availability AI platforms capable of supporting critical business operations with minimal downtime and enhanced data protection.

The inventors relied on principles of computer science and engineering, particularly in the domains of distributed systems, cybersecurity, and artificial intelligence. The inventors leveraged, among other things, the application of graph theory for contingency mapping, algorithmic development for disruption score computation, and cryptographic techniques for secure state transfer. The inventors employed engineering methodologies to design mechanisms for real-time monitoring, predictive analytics, and secure communication channels. The technical solutions required a deep understanding of distributed computing, secure data handling, and AI agent lifecycle management, all of which are rooted in scientific and technological disciplines.

At the outset, there was substantial technical uncertainty regarding the feasibility and effectiveness of dynamically transferring agent control and state between compute clusters in response to infrastructure disruptions. Key unknowns included, among other things, how to accurately compute disruption scores based on diverse operational metrics, how to securely transfer agent state without data loss or exposure, and how to maintain seamless execution of agent requests across heterogeneous environments. The inventors faced challenges in designing a system that could reliably detect and respond to disruptions, preserve security contexts, and ensure that agent state remained encrypted both in transit and at rest.

To address these uncertainties, the inventors employed a systematic process of experimentation involving iterative design, simulation, and validation. The inventors experimented with multiple approaches to state serialization, encryption, and transfer protocols. This structured experimentation enabled the inventors to refine the architecture and implement a dynamic agentic disruption processing system that meets requirements for reliability and data protection.

Example System Architecture(s)

FIG. 1 is a block diagram illustrating a system architecture 100 for a resilient mirrored AI infrastructure that can span hybrid deployment environments. The depicted system comprises multiple interconnected subsystems that, in combination, can deliver enterprise-grade availability and continuity for artificial intelligence services. The central principle of system architecture 100 is a distributed, active-active design in which multiple geographically separated sites can simultaneously serve production traffic while maintaining strict data consistency guarantees across the network.

The core infrastructure layer typically includes a Primary Site Cluster, which is shown in FIG. 1 as a deployment in a public cloud provider region (for example, AWS US-East). This cluster is designed as a comprehensive AI operational environment and can include large language models loaded in GPU or TPU memory, specialized fine-tuned models, databases for conversation state, persistent user session stores, request processor nodes orchestrated in containers (such as Kubernetes with 100 pods), and training/fine-tuning infrastructure to enable continuous learning and reinforcement learning from human feedback (RLHF). In some implementations, the Primary Site Cluster may be augmented with modules for automated machine learning (Auto-ML) and advanced analytics.

The architecture further comprises one or more Secondary Site Clusters that serve as mirrored environments with redundancy and geographic diversity. For example, the secondary site may be hosted in a separate cloud provider region, such as GCP EU-West. These secondary clusters maintain synchronized replicas of the LLM models (GPU/TPU model banks), replica conversation state databases with version syncing mechanisms, request processors, and training pipelines. In some implementations, the secondary clusters may be equipped to operate fully autonomously should a failure occur in the primary site, ensuring business continuity and uninterrupted service delivery.

The interconnection between primary and secondary clusters is managed using robust synchronization protocols. Model and state data can be replicated using techniques such as layer-wise differential sync, hierarchical compression, and multi-level check summing. The request processors and stateful databases at each site are designed to coordinate via event queues, distributed consensus mechanisms, and dynamic consistency models, allowing the infrastructure to maintain up-to-date models and user context data across sites with minimal latency.

In addition to the major clusters, system architecture 100 can include Edge Inference Nodes. These are lightweight deployments typically situated closer to the end users or data sources and can support latency-sensitive applications. Edge nodes can host smaller quantized models suitable for rapid inference, leverage local caching to reduce round-trip times, and regularly synchronize critical state data back to core sites. In some implementations, edge nodes are designed to provide automatic fallback or failover capability, enabling continued service in the event of connectivity interruptions or localized cluster outages.

FIG. 1 also shows various data flows and control interfaces between the components. In some implementations, inference requests from users can be routed to either the primary or secondary cluster based on composite metrics such as latency, resource utilization, model freshness, and data consistency requirements. The architecture can use intelligent traffic routing mechanisms to direct requests to the optimal cluster, thereby optimizing user experience while preserving the integrity and consistency of the underlying AI models and conversation states.

Each cluster and node within the architecture can operate semi-independently, allowing for autonomous operation and local decision making. For example, clusters can independently serve inference traffic, execute ongoing training jobs, and update conversation state databases while synchronizing critical data according to periodic or event-driven policies. In some implementations, local failure detection and self-repair mechanisms may be present in both primary and secondary clusters to further enhance infrastructure resilience.

System architecture 100 can support a diversity of deployment configurations, including hybrid environments integrating public cloud regions with private on-premises data centers, enabling organizations to meet data sovereignty, regulatory, and latency requirements through strategic workload placement. In some implementations, organizations can dynamically add or remove site clusters and edge nodes to accommodate changes in workload demand or geographic distribution.

FIG. 1 also illustrates several advanced operational capabilities, including real-time monitoring of cluster health metrics, predictive failure detection algorithms, and dynamic traffic shifting between sites. The infrastructure can support automatic failover, seamless rollback, and cascading failure prevention routines, thereby minimizing downtime and customer impact resulting from site-level or regional disruptions.

Overall, FIG. 1 demonstrates how a resilient mirrored AI infrastructure can be architected with active-active site clusters, synchronized state management, intelligent request routing, and optional edge deployments. In some implementations, the system further incorporates various innovations such as composite metric-based site selection, model freshness scoring, and dynamic business continuity features, establishing a robust foundation for mission-critical AI service delivery in modern, distributed computing environments.

Figure 2:
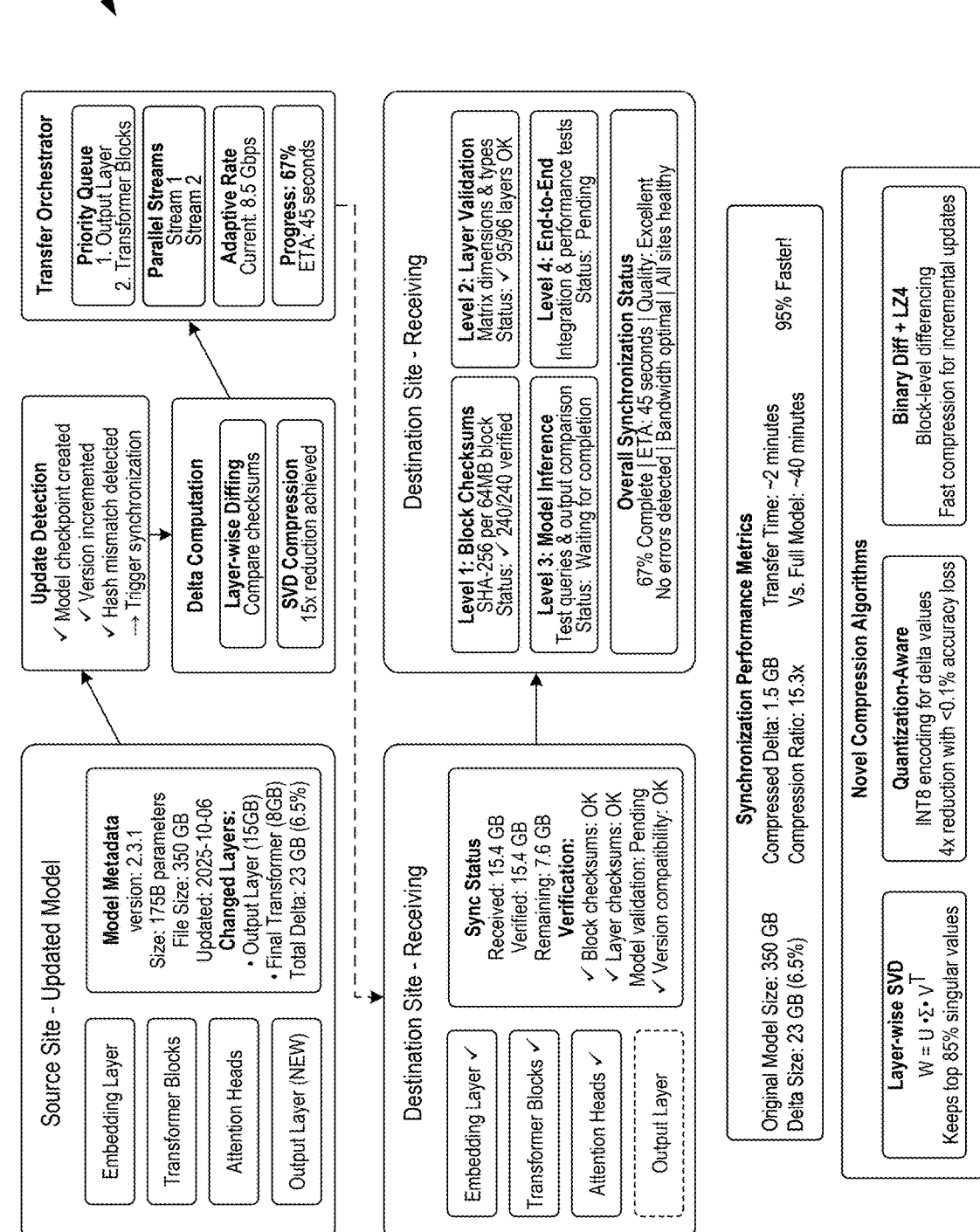
FIG. 2 is a block diagram showing a model synchronization engine including a layer-wise differential synchronization system with compression and verification mechanisms in accordance with some implementations of the present technology.

FIG. 2 is a block diagram illustrating a model synchronization engine architecture 200 that includes a layer-wise differential synchronization system equipped with advanced compression and verification mechanisms, enabling efficient management of large-scale AI models in distributed environments. The engine can serve as a central subsystem responsible for the reliable and bandwidth-effective synchronization of updated model parameters and state across geographically distinct AI clusters, thus facilitating high-availability and consistent performance in enterprise AI deployments.

The architecture starts at the source site, where the updated model is prepared for synchronization. In some implementations, the source model consists of several distinct components, such as Embedding Layers, Transformer Blocks, Attention Heads, and Output Layers. Each component is annotated with metadata, including version identifiers, parameter counts, file sizes, and update timestamps. This granular metadata enables detailed tracking of changes and underpins the selective synchronization strategy of the engine.

Synchronization is triggered upon the occurrence of specific events, such as model checkpoint creation, version increment, or hash mismatch detection. In some implementations, the update detection phase leverages delta computation using layer-wise differential analysis, where only the layers that exhibit changes since the last synchronization are processed. The engine can employ matrix decomposition methods, such as Singular Value Decomposition (SVD), to exploit the low-rank structure of weight matrices, achieving significant reduction in data volume for transmission.

Once the differential changes have been identified, the system compresses the resulting deltas using fast compression algorithms, such as LZ4, to further reduce bandwidth consumption. In some implementations, quantization-aware compression schemes can be utilized, especially when the model has been quantized for deployment on edge devices or resource-constrained clusters. Binary diffing is also supported for incremental checkpointing, allowing transmission of only the differences between saved states.

The engine is designed to accommodate multiple synchronization protocols, supporting both synchronous and asynchronous replication modes. Critical updates, such as those involving model architecture changes or safety-imperative fine-tuning, can be propagated synchronously to all replica sites to ensure strong consistency. More frequent, routine updates (e.g., ongoing reinforcement learning from human feedback) may be replicated asynchronously, providing eventual consistency while maintaining system performance.

For hybrid fine-tuning operations, the engine can apply a balanced protocol that assesses the trade-off between immediacy of propagation and bandwidth efficiency. In some implementations, the synchronization engine evaluates the urgency and size of the change to select either synchronous, asynchronous, or hybrid protocols based on pre-set thresholds or business continuity requirements.

The verification phase of the engine is critical to maintaining model integrity across distributed environments. In some implementations, multi-level check summing is applied, where each transmitted delta and reconstructed layer undergoes hash-based verification at both the sending and receiving ends. This helps detect transmission errors, misalignments, or data corruption, and can trigger automatic rollback or retransmission of affected segments.

After data is synchronized, the destination site reconstructs its model using the received verified deltas. The architecture can support independent compute resource allocation, enabling the receiving cluster to resume inference, training, and update operations with the newly synchronized model. In some implementations, rollback mechanisms allow the system to revert to previous states in the event of verification failure, maintaining operational stability.

Model synchronization engine architecture 200 is capable of scaling to support synchronization across several distributed clusters, reflecting the needs of modern AI deployments with active-active mirrored architectures. In some implementations, the engine may also be integrated with edge nodes utilizing smaller quantized models, ensuring that even resource-constrained environments benefit from consistent and efficient model updates.

Overall, FIG. 2 demonstrates a sophisticated model synchronization engine utilizing layer-wise differential sync, advanced compression, robust verification, and flexible protocol support. These features collectively enable enterprises to replicate vast artificial intelligence models across hybrid infrastructure, minimizing bandwidth consumption and preserving mathematical integrity of synchronized models while continuously supporting dynamic AI workloads.

FIG. 3 is a block diagram illustrating a state consistency framework 300 for a distributed AI infrastructure, employing a vector clock-based protocol to synchronize state across geographically dispersed sites. This framework can ensure that key operational data, such as conversation context, user sessions, and processing state, remains coherent throughout mirrored deployments, even during concurrent updates and periods of partial network failure.

FIG. 3 depicts three site state modules representing different deployment locations (Site A: Primary, Site B: Secondary, Site C: On-Premises). Each site maintains a vector clock including a logical array that records the sequence and receipt of local and remote events. For instance, Site A's vector clock may appear as [3, 2, 1], reflecting its history of three local events, having observed two events from Site B, and one event from Site C. In some implementations, additional metadata such as session identifiers, last update time, and synchronization status may be included in the local state representations.

One or more of the site modules can include elements such as user session data, previous message logs, and model update status. In some implementations, conversation context may capture multi-turn dialogue history, user preference profiles, and even results of in-flight model training. The synchronization status can be visually indicated, e.g., sites can be marked as fully synchronized, partially synchronized, or unsynchronized to convey their current coherence state relative to peers.

Each event, such as a new message or profile update, can be tagged with vector clock data, enabling the system to determine causal relationships among events. In some implementations, propagation may occur via secure message queues or distributed ledger entries, supporting transactional integrity and auditability. Conflicts can arise when updates are made concurrently at different sites. Framework 300 can detect such instances using vector clock comparison. For example, if Site B and Site C independently update a user session at the same logical time, their vector clocks reflect concurrency and signal a conflict. In some implementations, conflict resolution strategies may be application-specific, e.g., for conversational data, "last-write-wins" or semantic merging algorithms may be used, while for training metadata, prioritized aggregation or rollback may be preferred.

Framework 300 can support multiple configurable consistency levels. For mission-critical model weights, the system can enforce strong consistency, meaning synchronous replication of updates to all sites before the change is considered committed. This may include a strict sequence of model updates flowing between all clusters. In some implementations, strong consistency protocols may utilize distributed consensus algorithms such as Paxos or Raft for atomic commit guarantees. For conversational state, the system can employ causal consistency supported by the vector clock protocol. Updates are only made visible once all causally earlier events are observed. As illustrated in FIG. 3, sites can propagate and apply messages in causal order to maintain coherent dialogue context. In some implementations, causal consistency can be leveraged for collaborative use cases, where simultaneous edits or inputs are expected and need to be integrated seamlessly.

For analytic data such as logs and telemetry, framework 300 can utilize eventual consistency. FIG. 3 illustrates how updates may be temporarily out of order or delayed at some sites but will eventually reconcile to a uniform state across all deployments. In some implementations, eventual consistency protocols can help minimize latency and bandwidth costs for non-critical data, allowing asynchronous batching and checkpointing. Framework 300 can support read-your-writes consistency for certain user profile operations. This ensures that users who update their own settings or preferences can immediately see the results of their changes, regardless of possible propagation delays to other sites. Framework 300 can include direct update paths for these cases, in some implementations utilizing session stickiness or localized caching to accelerate feedback.

Overall, FIG. 3 demonstrates a robust state consistency framework 300 that can flexibly accommodate diverse consistency and replication requirements across mirrored AI infrastructure. By employing vector clock-based causal ordering, application-specific conflict resolution, and configurable protocols for different data types, the system enables high availability, operational continuity, and strong user experience for distributed AI services.

FIG. 4 is a block diagram illustrating an Automatic Failover System 400 for resilient AI infrastructure, in accordance with some implementations of the present technology. This system can provide continuous health monitoring for multiple, geographically distributed sites, and is designed to maintain service availability by executing intelligent failover decisions. The block diagram includes illustrative core components, data flows, and operational logic underlying the failover system's operation across cloud and hybrid environments.

In some implementations, health monitoring functionality can gather multi-dimensional metrics including infrastructure utilization (e.g., CPU, GPU, memory usage), application performance indicators (requests per second, error rates, latency, throughput), synthetic transaction results (transaction pass/fail rates and consistency checks), and predictive analytics (trend analysis, anomaly scores, projected failure rates). These metrics are collected in real time or at scheduled intervals, allowing the system to maintain proactive visibility into the operational status and stability of each site cluster.

System 400 can include computation of dynamic health scores for each site using a weighted formula, allowing for flexible adjustment of metric importance as needed. For example, the health score may be expressed as Score=0.3*Infra+0.2*App+0.2*Synthetic+0.3*Predictive, reflecting the aggregate state of various subsystems. Threshold values can be defined for automated response: scores between 0-40 can trigger immediate failover, 40-70 can initiate gradual traffic reduction, and 70-85 may warrant enhanced monitoring only. This flexible scoring system can enhance the precision and responsiveness of failure detection.

Failure detection mechanisms can operate continuously, comparing current health scores with established thresholds and maintaining historical logs of metric trends. In some implementations, detection subsystems may employ artificial intelligence models for anomaly detection and prediction, further increasing detection accuracy. When a site's health score crosses the critical failover threshold, the system can automatically flag the site as inoperative or degraded, prompting failover initiation to preselected candidate clusters.

System 400 can include the process of intelligent traffic shifting. This mechanism, in some implementations, can dynamically reroute service requests from a failing or degraded site to one or more healthy candidate sites based on their respective health scores, available capacity, and real-time performance. Candidate selection may be informed by capacity information, operational readiness, and the impact analysis of potential traffic redistribution. The goal can be to minimize end-user disruption while maximizing resource utilization and maintaining balanced loads.

Impact analysis preceding failover execution can include simulation of traffic distributions, estimation of latency and error rate changes, and validation of failover paths. In some implementations, the system may support pre-failover synthetic transactions or "canary" requests, assigning small volumes to candidate sites before full traffic shifting. This can ensure candidate sites are able to sustain increased demand and serve real user workloads without negative impact.

Gradual traffic shifting is visualized as stepwise increments in FIG. 4. The system, in some implementations, can transfer traffic in controlled batches, verifying service health and user experience at each stage. If issues are detected, such as rising latency, error rates, or resource exhaustion, the system can halt further traffic transfer and conduct root cause analysis before proceeding. This can minimize risk and ensures continuous monitoring during the failover process.

Automatic rollback capabilities can be integrated into system 400, allowing the infrastructure to revert traffic allocations in response to unexpected failures in candidate sites or adverse outcomes detected during traffic shifting. In some implementations, rollback operations may be triggered instantly if health scores deteriorate post-failover, restoring traffic flows to their pre-failover configuration or redirecting to alternative sites through pre-defined fallback paths.

In some implementations, new health metrics, detection algorithms, candidate selection policies, and rollback procedures can be integrated without system downtime. Customization of failover logic, integration with external monitoring platforms, or adaptation to regulatory and business continuity requirements may be supported through pluggable modules and dynamic configuration interfaces.

System 400, as depicted in FIG. 4, can greatly enhance the resilience and availability of AI services deployed across complex, distributed environments. By leveraging multi-dimensional monitoring, intelligent detection and traffic shifting, and robust rollback features, the system can ensure minimal service disruption, optimal resource utilization, and enterprise-grade reliability for mission-critical AI workloads in both cloud and hybrid settings.

Method(s) of Operation of the Example System Architecture(s)

Figure 5:
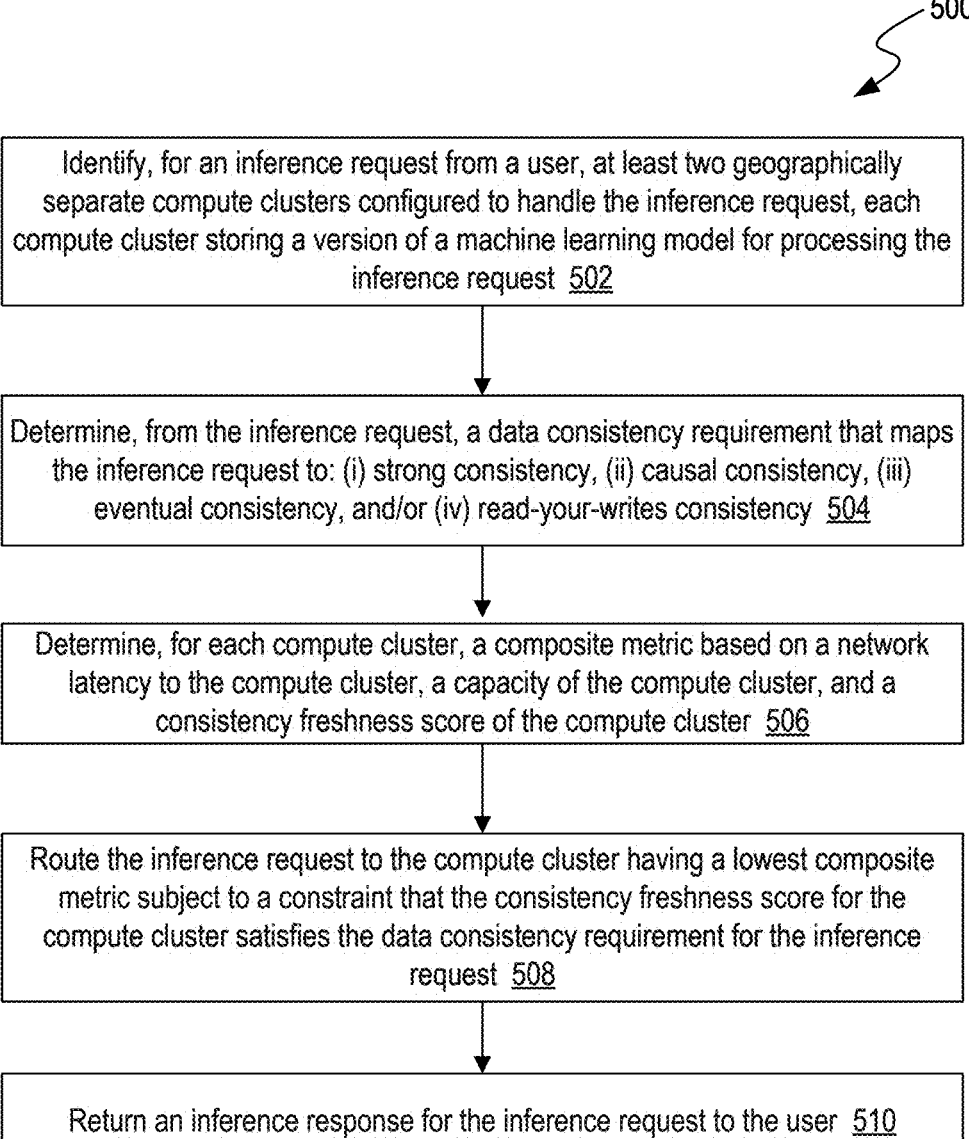
FIG. 5 is a flow diagram illustrating an example process for an active-active mirrored artificial intelligence architecture by the disclosed system in some implementations of the present technology.

FIG. 5 is a flow diagram illustrating example process 500 for an active-active mirrored artificial intelligence architecture by the disclosed system in some implementations of the present technology. For example, some or all operations of process 500 can be performed and/or controlled by computing environment 800 (see FIG. 8) or another suitable system, either alone or in combination with other system(s).

At 502, the disclosed system identifies, for an inference request from a user, at least two geographically separate compute clusters configured to handle the inference request, each compute cluster storing a version of an artificial intelligence model for processing the inference request. In some implementations, the versions could be the same or different unless otherwise specified. For example, as illustrated in FIG. 1, a primary cloud cluster located in AWS US-East and a secondary cloud cluster in GCP EU-West can both host identical versions of a large language model loaded into GPU memory. When a user submits an inference request, the system determines that both the primary and secondary clusters are available and properly synchronized to handle the request.

At 504, the disclosed system determines, from the inference request, a data consistency requirement that maps the inference request to: (i) strong consistency, (ii) causal consistency, (iii) eventual consistency, and/or (iv) read-your-writes consistency. For example, if the request relates to updating model weights or mission-critical business logic, the system can map it to strong consistency, ensuring synchronous model replication across all sites as described in FIG. 2. If the request involves conversational AI, the system may apply causal consistency, utilizing vector clocks for session state ordering as depicted in FIG. 3.

At 506, the disclosed system determines, for each compute cluster, a composite metric based on a network latency to the compute cluster, a capacity of the compute cluster, and a consistency freshness score of the compute cluster. In some implementations, a consistency freshness score includes a quantitative metric to measure how up-to-date and synchronized a given compute cluster's state is relative to the most recent committed global state. The consistency freshness score can be expressed as a numerical value (e.g., in the form of a percentage or on a continuous numerical scale, such as a score from 0 to 100). A higher score can represent more recent and consistent data, whereas a lower score can signal greater staleness or lag between compute clusters. For example, the system can calculate round-trip latency to both clusters, assess active pod count and available GPU resources (see FIG. 1), and use the vector clock divergence metric for consistency freshness (as shown in FIG. 3) to generate a composite score for routing decisions.

In some implementations, the consistency freshness score of the compute cluster for conversation state is computed as a vector clock divergence value, and determining the composite metric for the compute cluster comprises penalizing the composite metric for the compute cluster proportional to the vector clock divergence value. For example, if the vector clock at the secondary cluster lags behind the primary for conversation state, the system can increase the composite metric for the secondary cluster, making it less likely to receive that inference request (see FIG. 3).

In some implementations, one or more analytics records generated by the inference request are tagged for asynchronous replication, and determining the composite metric for the compute cluster excludes the consistency freshness score for analytics data, thereby favoring lower latency compute clusters. For example, when determining where to write non-critical log events or telemetry data, the system can prioritize clusters with the lowest latency regardless of vector clock divergence as causal or strong consistency is not required for analytics (see FIG. 3).

In some implementations, a session affinity token accompanies the inference request, and determining the composite metric comprises penalizing the composite metric for the compute cluster that does not hold a most recent user profile version linked to the session affinity token. For example, if the primary cluster holds the most up-to-date user profile for a session token included in the request, the system penalizes all other clusters lacking that data when calculating the composite metric, thus favoring the cluster with the freshest profile data. This is supported by session affinity features shown in FIG. 1 and user profile flows for read-your-writes consistency in FIG. 3.

At 508, the disclosed system routes the inference request to a selected compute cluster having the lowest composite metric subject to a constraint that the consistency freshness score for the compute cluster satisfies the data consistency requirement for the inference request. For example, if the secondary cluster has a sufficiently up-to-date vector clock and offers lower latency and higher available capacity, the request is routed there; if not, it is routed to the primary cluster. This routing process can be seen in FIG. 1 showing active-active site selection.

In some implementations, routing the inference request further comprises computing a layer-wise delta between an updated model checkpoint and its previously replicated state and transmitting only those model weights that differ. For example, as shown in FIG. 2, the system uses its synchronization engine to detect only those changed weights in the model and transmits the smaller set of updates to efficiently synchronize clusters before fulfilling the request.

In some implementations, the layer-wise delta is singular value decomposition (SVD)-compressed and INT8-quantized before transmission, thereby shortening replication time for subsequent requests. For example, the delta is passed through SVD for low-rank decomposition and quantized to INT8 format, reducing bandwidth and transfer time, as outlined by compression and quantization modules in FIG. 2.

At 510, the disclosed system returns an inference response for the inference request to the user. For example, following successful inference at the selected cluster, the system delivers the result to the user.

In some implementations, the disclosed system replicates model weight and/or configuration update triggered while routing the inference request, the replication being enforced under (i) strong consistency for model weight data and (ii) eventual or causal consistency for non-critical analytics data generated by the inference request. For example, an updated model weight triggered by the inference request is synchronously replicated to all clusters in accordance with strong consistency guarantees (see FIG. 2), while analytics data such as usage logs is asynchronously replicated per eventual consistency mechanisms described in FIG. 3.

In some implementations, the disclosed system captures a conversation state of the inference request and replicates the conversation state to another compute cluster in parallel with the inference to enable a seamless mid-conversation failover. For example, as depicted in FIG. 3 and FIG. 4, the user's real-time dialogue context is copied to a backup cluster as the inference proceeds, allowing instant failover without interruption in case the primary experiences a fault.

In some implementations, the disclosed system, for requests originating from autonomous AI agents, maps each agent to a backup compute cluster and pre-stage agent state so that the inference request can be re-issued from the backup compute cluster without data loss. For example, by pre-staging agent state and session history on a secondary cluster as shown in FIG. 1, autonomous agent requests can be rerouted seamlessly in the event of cluster failure.

In some implementations, every model weight replicated during fulfillment of the inference request is cryptographically signed and appended to a distributed ledger, providing a tamper-evident audit trail for the inference request. For example, once model weight updates are transmitted between clusters (see FIG. 2), each update is digitally signed and logged on a distributed ledger accessible to all mirrored sites, ensuring accountability and auditability of model changes.

It is contemplated that the operations or descriptions of FIG. 5 may be used with any other implementation of this disclosure. In addition, the operations and descriptions described in relation to FIG. 5 may be done in alternative orders or in parallel to further the purposes of this disclosure. For example, each of these operations may be performed in any order, in parallel, or simultaneously to reduce lag or increase the speed of the system or method. Furthermore, it should be noted that any of the devices or equipment discussed in relation to the other figures or otherwise disclosed herein could be used to perform one or more of the operations in FIG. 5.

FIG. 6 is a flow diagram illustrating example process 600 for dynamic agentic disruption processing by the disclosed system in some implementations of the present technology. For example, some or all operations of process 600 can be performed and/or controlled by computing environment 800 (see FIG. 8) or another suitable system, either alone or in combination with other system(s).

At 602, the disclosed system identifies a contingency graph that links an agent issuing an agent request with a plurality of compute clusters including a primary compute cluster executing the agent request and a mirrored compute cluster, each compute cluster hosting a version of an artificial intelligence model and an agent state, the contingency graph further including a security context for the agent. In some implementations, the versions could be the same or different unless otherwise specified. For example, as illustrated in FIG. 1, the system's contingency graph can map the agent to AWS (primary) and GCP (mirror) clusters, recording session state, available models, and the agent's security tokens to ensure correct routing and secure access.

In some implementations, the primary compute cluster and the mirrored compute cluster are part of an active-active architecture, enabling a failover that routes the agent request to the mirrored compute cluster. For example, referencing FIG. 4, an active-active topology allows the mirrored cluster to begin processing instantly upon detection of failure conditions at the primary, rather than waiting for cluster promotion or manual intervention.

At 604, the disclosed system generates a disruption score for the primary compute cluster based on infrastructure telemetry, application metrics, security events, and/or predictive analytics associated with the agent request. For example, the system collects real-time CPU, memory, and GPU statistics, response latencies, error logs, and security anomaly signals to compute the disruption score, as shown by health monitoring modules in FIG. 4.

In some implementations, the disruption score is further computed as a function of infrastructure metrics, application metrics, synthetic tests, and/or predictive anomaly analysis. For example, synthetic test transactions can be continuously executed across all clusters, and machine learning anomaly detection models (see FIG. 4) may integrate the results to adjust the disruption score, with a sudden spike in failed synthetic transfers indicative of impending failure.

At 606, the disclosed system, responsive to the disruption score satisfying a condition, transfers, to the mirrored compute cluster, control of the agent and the agent state tied to the agent request, the transfer being executed over a cryptographically authenticated channel associated with the security context for the agent. For example, once the score passes a critical threshold, the agent's session and model data are transferred from AWS to GCP using a mutually authenticated TLS/SSL tunnel, as referenced in FIG. 1 and FIG. 4.

In some implementations, transferring control of the agent and the agent state tied to the agent request includes sending layer-wise deltas of modified model weights instead of a full model checkpoint. For example, as outlined in FIG. 2, only the updated portions of the agent's underlying model are transmitted, reducing the time necessary for the transfer and sustaining continuity of service.

In some implementations, the layer-wise deltas are singular value decomposition (SVD)-compressed and INT8-quantized, thereby reducing transfer payload and allowing the agent request to resume faster. For example, the system utilizes SVD decomposition and INT8 quantization on the layer-wise deltas, as depicted in FIG. 2, shortening recovery and resumption intervals for real-time or near-real-time agent requests.

In some implementations, the agent state is migrated under a hybrid consistency profile that applies strong consistency to model weight data and causal consistency to conversational context. For example, model weight migrations use atomic commit protocols described in FIG. 2 for strong consistency, while conversational context leverages vector clock causal ordering and conflict resolution frameworks as depicted in FIG. 3.

In some implementations, the agent transfer includes validating the agent state by checksum and replaying at least one synthetic task before the mirrored compute cluster outputs a response for the agent request. For example, following the agent state transfer, the receiving cluster performs checksum verification and synthetic inference test runs, in line with health assessment protocols in FIG. 4, confirming both integrity and readiness before fulfilling the user's agent request.

At 608, the disclosed system directs execution of the agent request from the mirrored compute cluster using the security context for the agent such that the agent state remains encrypted in transit and at rest. The agent request completes at the mirrored compute cluster subsequent to the disruption score satisfying the condition during mid-request while preserving end-to-end security of the agent state. For example, cryptographic keys and session tokens are used throughout the transfer (see FIG. 1), with all sensitive agent data encrypted during inter-site migration and rest.

In some implementations, the disclosed system serializes user session tokens and intermediate reasoning chains associated with the agent request and reattaches the user session tokens at the mirrored compute cluster. For example, as shown in FIG. 3, user session serialization ensures conversational context continuity, with reasoning chain data directly linked to the user's replicated session on the mirrored site.

In some implementations, choosing the mirrored compute cluster for the agent request is constrained by a cross-cloud placement optimizer that discards candidates violating data sovereignty rules. For example, referencing deployment policies in FIG. 1, the system can use metadata about jurisdiction, residency, and compliance provided by the placement optimizer to select only those clusters where local regulations such as GDPR or HIPAA are satisfied, excluding non-conforming mirrors.

In some implementations, every transfer event, accompanying disruption score, and post-transfer validation outcome is immutably logged to a distributed ledger for forensic audit review of the agent request. For example, as illustrated in FIG. 2, each agent migration is cryptographically signed and appended to a distributed ledger, ensuring every step in the disruption processing lifecycle is auditable and tamper-evident across all mirrored clusters.

It is contemplated that the operations or descriptions of FIG. 6 may be used with any other implementation of this disclosure. In addition, the operations and descriptions described in relation to FIG. 6 may be done in alternative orders or in parallel to further the purposes of this disclosure. For example, each of these operations may be performed in any order, in parallel, or simultaneously to reduce lag or increase the speed of the system or method. Furthermore, it should be noted that any of the devices or equipment discussed in relation to the other figures or otherwise disclosed herein could be used to perform one or more of the operations in FIG. 6.

Artificial Intelligence Model(s) of the Example System Architecture(s)

Figure 7A:
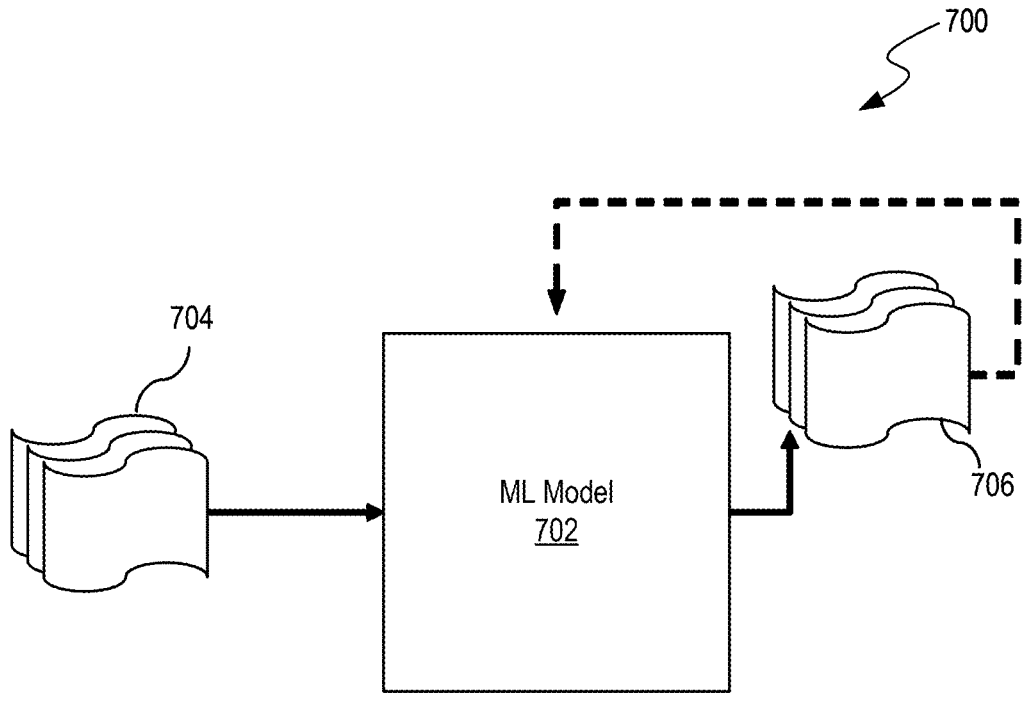
FIG. 7A is a block diagram illustrating an example artificial intelligence model of a computing environment in which the disclosed system operates in some implementations of the present technology.

FIG. 7A is a block diagram 700 illustrating an example artificial intelligence model, machine learning model 702, of a computing environment in which the disclosed system operates in some implementations of the present technology. According to various implementations, the described systems can include one or more artificial intelligence models. The artificial intelligence models can be structured to perform any suitable artificial intelligence-based operations to perform end-to-end traceability of software feature changes for various computing systems within an organization and/or the like. Machine learning models can include one or more convolutional neural networks (CNN), deep learning (DL) models, translational models, natural language processing (NLP) models, computer vision-based models, decision trees, Bayesian models, generative models, or any other suitable models for enabling the operations described herein.

In some implementations, the artificial intelligence models, such as the machine learning model 702, can include one or more neural networks. As an example, neural networks may be based on a large collection of neural units (or artificial neurons). Neural networks may loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit may have a summation function which combines the values of all its inputs together. In some embodiments, each connection (or the neural unit itself) may have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free-flowing, with connections interacting in a more chaotic and complex fashion.

As an example, machine learning model 702 can ingest inputs 704 and provide outputs 706. In one use case, outputs 706 can be fed back to a machine learning model as inputs to train the machine learning model (e.g., alone or in conjunction with user indications of the accuracy of outputs, labels associated with the inputs, or with other reference feedback information). In another use case, a machine learning model 702 can update its configurations (e.g., weights, biases, or other parameters) based on its assessment of its prediction (e.g., outputs 706) and reference feedback information (e.g., user indication of accuracy, reference labels, or other information). In another use case, where a machine learning model 702 is a neural network, connection weights can be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this manner, for example, the machine learning model 702 may be trained to generate better predictions.

As an example, where the prediction models include a neural network, the neural network can include one or more input layers, hidden layers, and output layers. The input and output layers can respectively include one or more nodes, and the hidden layers may each include a plurality of nodes. When an overall neural network includes multiple portions trained for different objectives, there may or may not be input layers or output layers between the different portions. The neural network can also include different input layers to receive various input data. Also, in differing examples, data can input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

According to various implementations, machine learning models can be trained based on information stored in a local data store associated with the described systems and/or an associated remote data store.

Transformer for Neural Network

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the model can be a neural network with multiple input nodes that receive input. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as the output. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A machine learning model can be trained with supervised learning, where the training data includes input and a desired output. A representation can be provided to the model. Output from the model can be compared to the desired output and, based on the comparison, the model can be modified, such as by changing weights between nodes of the neural network or parameters of the functions used at each node in the neural network (e.g., applying a loss function). After applying each of the input in the training data and modifying the model in this manner, the model can be trained to evaluate new input.

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., PYTHON, JAVASCRIPT, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 7B:
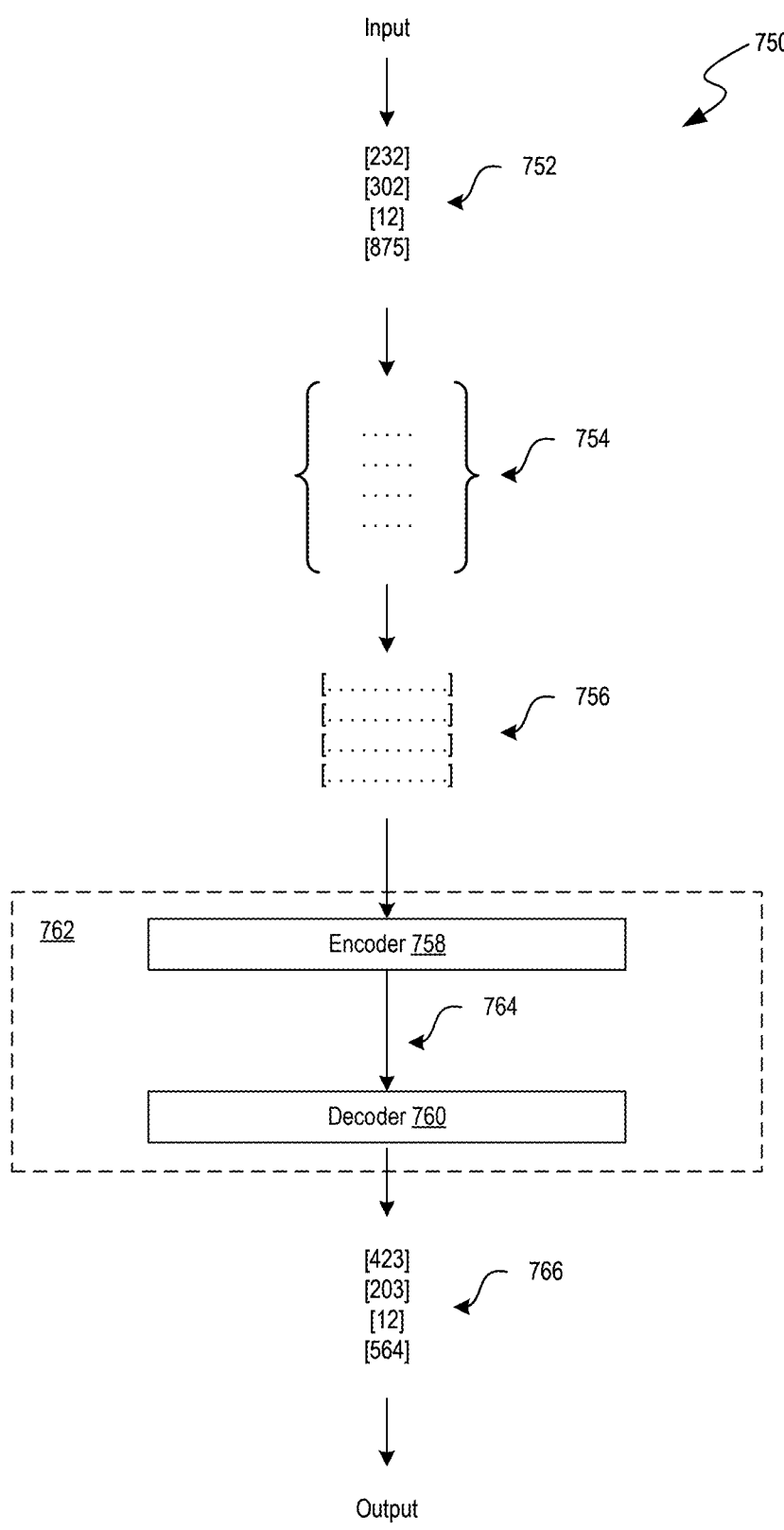
FIG. 7B is a block diagram illustrating an example generative model that can be used to implement at least some aspects of the present technology.

FIG. 7B is a block diagram 750 of an example transformer 762. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 762 includes an encoder 758 (which can comprise one or more encoder layers/blocks connected in series) and a decoder 760 (which can comprise one or more decoder layers/blocks connected in series). Generally, the encoder 758 and the decoder 760 each include a plurality of neural network layers, at least one of which can be a self-attention layer. The parameters of the neural network layers can be referred to as the parameters of the language model.

The transformer 762 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 762 is trained to perform certain functions on other input formats than natural language input. For example, the input can include objects, images, audio content, or video content, or a combination thereof.

The transformer 762 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 7B illustrates an example of how the transformer 762 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 7B, a short sequence of tokens 752 corresponding to the input text is illustrated as input to the transformer 762. Tokenization of the text sequence into the tokens 752 can be performed by some pre-processing tokenization module such as, for example, a byte-pair encoding tokenizer (the "pre" referring to the tokenization occurring prior to the processing of the tokenized input by the LLM), which is not shown in FIG. 7B for simplicity. In general, the token sequence that is inputted to the transformer 762 can be of any length up to a maximum length defined based on the dimensions of the transformer 762. Each token 752 in the token sequence is converted into an embedding vector 756 (also referred to simply as an embedding 756). An embedding 756 is a learned numerical representation (such as, for example, a vector) of a token that captures some semantic meaning of the text segment represented by the token 752. The embedding 756 represents the text segment corresponding to the token 752 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 756 corresponding to the "write" token will be closer to another embedding corresponding to the "jot down" token in the vector space as compared to the distance between the embedding 756 corresponding to the "write" token and another embedding corresponding to the "summary" token.

The vector space can be defined by the dimensions and values of the embedding vectors. Various techniques can be used to convert a token 752 to an embedding 756. For example, another trained ML model can be used to convert the token 752 into an embedding 756. In particular, another trained ML model can be used to convert the token 752 into an embedding 756 in a way that encodes additional information into the embedding 756 (e.g., a trained ML model can encode positional information about the position of the token 752 in the text sequence into the embedding 756). In some examples, the numerical value of the token 752 can be used to look up the corresponding embedding in an embedding matrix 754 (which can be learned during training of the transformer 762).

The generated embeddings 756 are input into the encoder 758. The encoder 758 serves to encode the embeddings 756 into feature vectors 764 that represent the latent features of the embeddings 756. The encoder 758 can encode positional information (i.e., information about the sequence of the input) in the feature vectors 764. The feature vectors 764 can have very high dimensionality (e.g., on the order of thousands or tens of thousands), with each element in a feature vector 764 corresponding to a respective feature. The numerical weight of each element in a feature vector 764 represents the importance of the corresponding feature. The space of all possible feature vectors 764 that can be generated by the encoder 758 can be referred to as the latent space or feature space.

Conceptually, the decoder 760 is designed to map the features represented by the feature vectors 764 into meaningful output, which can depend on the task that was assigned to the transformer 762. For example, if the transformer 762 is used for a translation task, the decoder 760 can map the feature vectors 764 into text output in a target language different from the language of the original tokens 752. Generally, in a generative language model, the decoder 760 serves to decode the feature vectors 764 into a sequence of tokens. The decoder 760 can generate output tokens 766 one by one. Each output token 766 can be fed back as input to the decoder 760 in order to generate the next output token 766. By feeding back the generated output and applying self-attention, the decoder 760 is able to generate a sequence of output tokens 766 that has sequential meaning (e.g., the resulting output text sequence is understandable as a sentence and obeys grammatical rules). The decoder 760 can generate output tokens 766 until a special [EOT] token (indicating the end of the text) is generated. The resulting sequence of output tokens 766 can then be converted to a text sequence in post-processing. For example, each output token 766 can be an integer number that corresponds to a vocabulary index. By looking up the text segment using the vocabulary index, the text segment corresponding to each output token 766 can be retrieved, the text segments can be concatenated together, and the final output text sequence can be obtained.

In some examples, the input provided to the transformer 762 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Environment(s) of the Example System Architecture(s)

Figure 8:
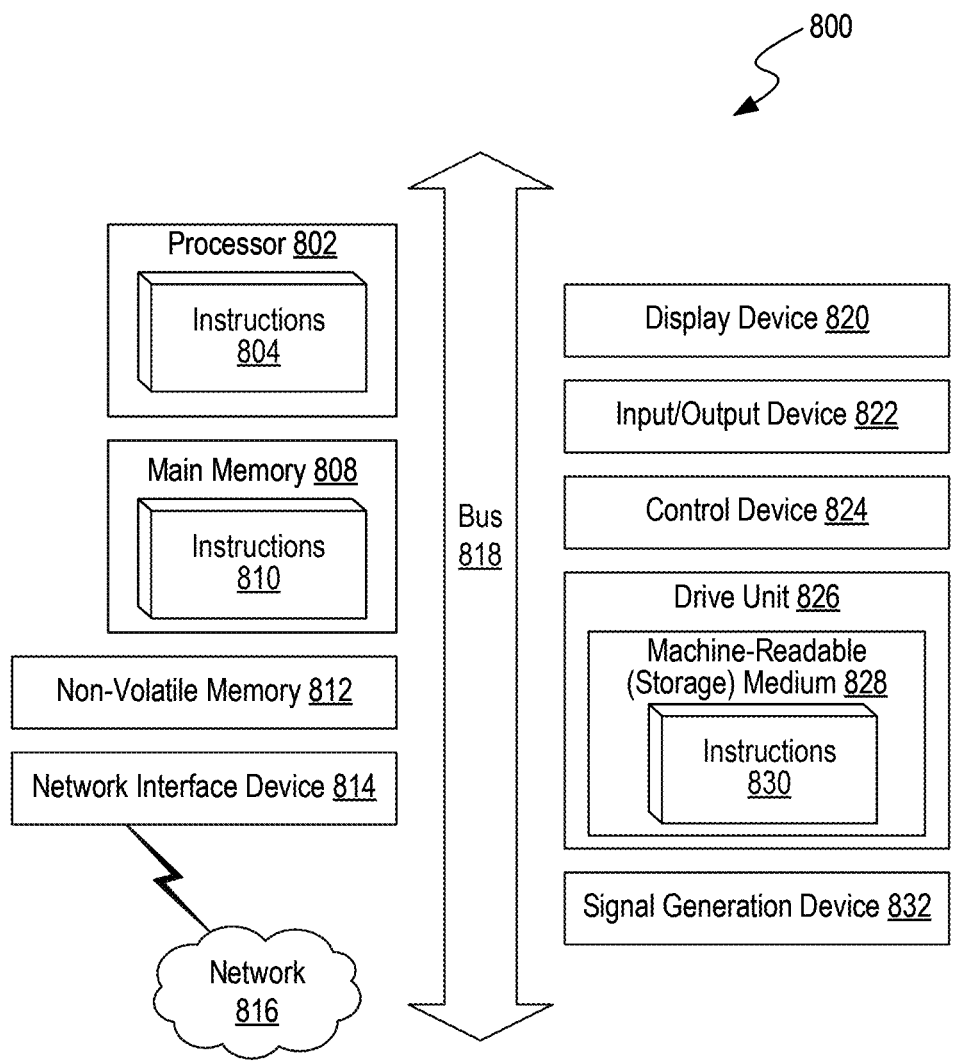
FIG. 8 is a block diagram illustrating an example of a computing environment in which the disclosed system operates in some implementations of the present technology.

FIG. 8 is a block diagram illustrating an example of a computing environment 800 in which the disclosed system operates in some implementations of the present technology. In various implementations, these computer systems and other devices can include server computer systems, desktop computer systems, laptop computer systems, netbooks, mobile phones, personal digital assistants, televisions, cameras, automobile computers, electronic media players, etc. In various implementations, the computer systems and devices include zero or more of each of the following: a processor or a central processing unit (CPU) 802 for executing computer programs, e.g., instructions 804; a computer memory 808 for storing programs and data, e.g., instructions 810, while they are being used, including the facility and associated data, an operating system including a kernel, and device drivers; a persistent storage device or a non-volatile memory 812, such as a hard drive or flash drive for persistently storing programs and data; a drive unit 826 including computer-readable media drives 828 that are tangible storage means that do not include a transitory, propagating signal, such as a floppy, CD-ROM, or DVD drive, for reading programs and data, e.g., instructions 830, stored on a computer-readable medium; a network interface device 814 with a network connection 816 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; a bus 818; a display device 820; an input/output device 822; a control device 824; and a signal generation device 832. While computer systems configured as described above are typically used to support the operation of a facility, those skilled in the art will appreciate that the facility may be implemented using devices of various types and configurations, and having various components.

Figure 9:
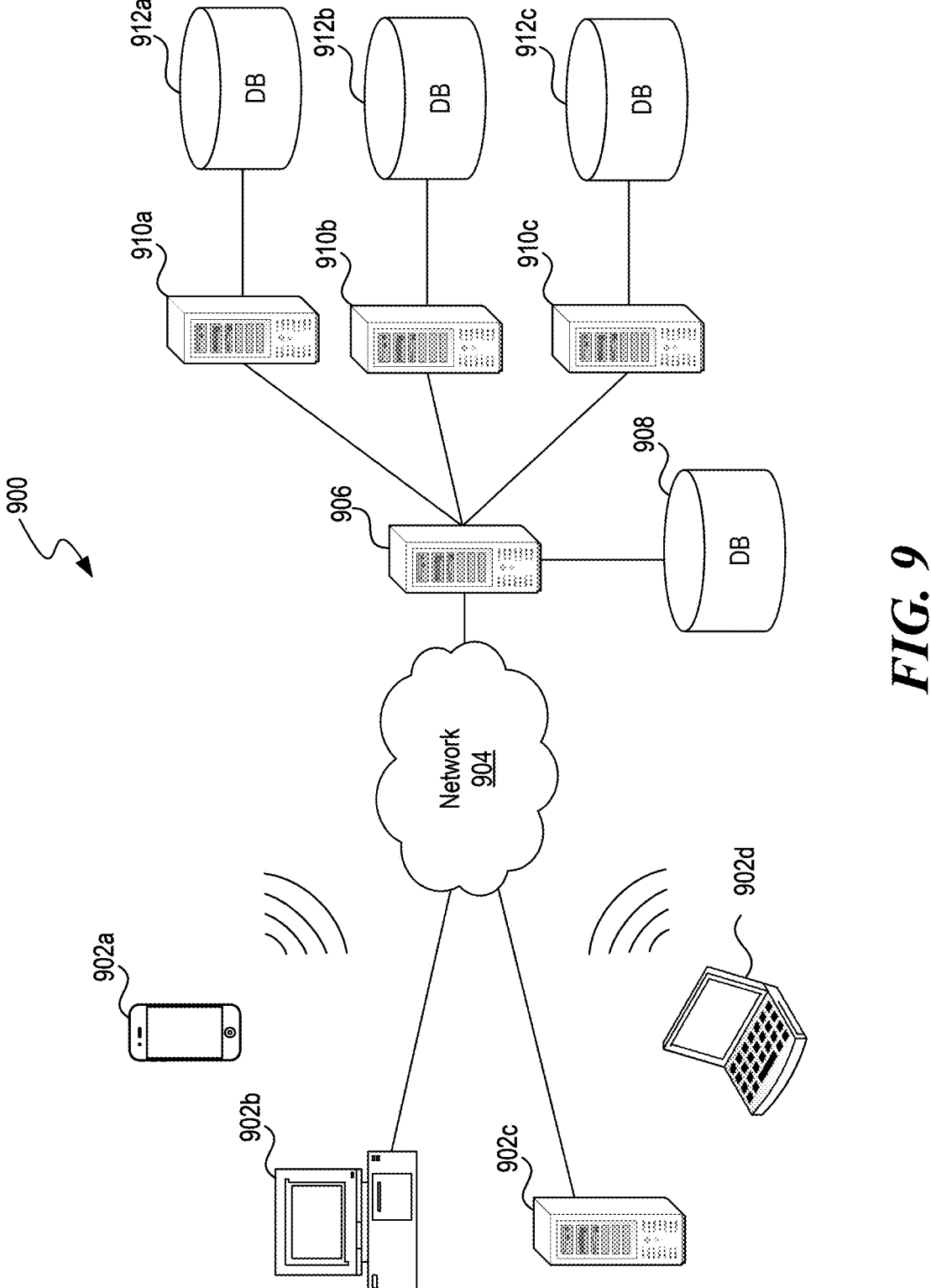
FIG. 9 is a system diagram showing some of the components typically incorporated in at least some of the computer systems and other devices on which the disclosed system operates in accordance with some implementations of the present technology.

FIG. 9 is a system diagram showing some of the components typically incorporated in at least some of the computer systems and other devices on which the disclosed system operates in accordance with some implementations of the present technology. In some implementations, environment 900 includes one or more client computing devices 902A-D, examples of which can host the described systems. Client computing devices 902A-D operate in a networked environment using logical connections through network 904 to one or more remote computers, such as a server computing device.

In some implementations, server 906 is an edge server which receives client requests and coordinates fulfillment of those requests through other servers, such as servers 910A-C. In some implementations, server 906 connects to a corresponding database 908. In some implementations, server computing devices 910A-C comprise computing systems. Though each server computing device 910A-C is displayed logically as a single server, server computing devices can each be a distributed computing environment encompassing multiple computing devices located at the same or at geographically disparate physical locations. In some implementations, each server 910A-C corresponds to a group of servers.

Client computing devices 902A-D and server computing devices 910A-C can each act as a server or client to other server or client devices. In some implementations, servers 910A-C connect to a corresponding database 912A-C. As discussed above, each server 910A-C can correspond to a group of servers, and each of these servers can share a database or can have its own database. Databases 912A-C warehouse (e.g., store) information such items included in various data streams. Though databases 912A-C are displayed logically as single units, databases 912A-C can each be a distributed computing environment encompassing multiple computing devices, can be located within their corresponding server, or can be located at the same or at geographically disparate physical locations.

Network 904 can be a local area network (LAN) or a wide area network (WAN), but can also be other wired or wireless networks. In some implementations, network 904 is the Internet or some other public or private network. Client computing devices 902A-D are connected to network 904 through a network interface, such as by wired or wireless communication. While the connections between server 906 and servers 910A-C are shown as separate connections, these connections can be any kind of local, wide area, wired, or wireless network, including network 904 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a non-transitory computer-readable media claim, other aspects may likewise be embodied as a non-transitory computer-readable media claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. One or more non-transitory computer-readable storage media storing instructions that, when executed by one or more processors, cause the one or more processors to perform operations that respond to an inference request, the operations comprising:

identifying, for an inference request from a user, at least two geographically separate compute clusters configured to handle the inference request, each compute cluster storing a version of an artificial intelligence model for processing the inference request;

determining, from the inference request, a data consistency requirement that maps the inference request to: (i) strong consistency, (ii) causal consistency, (iii) eventual consistency, and/or (iv) read-your-writes consistency;

determining, for each compute cluster, a composite metric based on a network latency to the compute cluster, a capacity of the compute cluster, and a consistency freshness score of the compute cluster;

routing the inference request to a selected compute cluster having a lowest composite metric subject to a constraint that the consistency freshness score for the compute cluster satisfies the data consistency requirement for the inference request; and returning an inference response for the inference request to the user, wherein the inference response was generated by the selected compute cluster.

2. The one or more non-transitory computer-readable storage media of claim 1, wherein the consistency freshness score of the compute cluster for conversation state is computed as a vector clock divergence value, and wherein determining the composite metric for the compute cluster comprises penalizing the composite metric for the compute cluster proportional to the vector clock divergence value.

3. The one or more non-transitory computer-readable storage media of claim 1, wherein one or more analytics records generated by the inference request are tagged for asynchronous replication, and wherein determining the composite metric for the compute cluster excludes the consistency freshness score for analytics data, thereby favoring lower latency compute clusters.

4. The one or more non-transitory computer-readable storage media of claim 1, wherein a session affinity token accompanies the inference request, and wherein determining the composite metric comprises penalizing the composite metric for the compute cluster that does not hold a most recent user profile version linked to the session affinity token.

5. The one or more non-transitory computer-readable storage media of claim 1, wherein routing the inference request further comprises computing a layer-wise delta between an updated model checkpoint and its previously replicated state and transmitting only those model weights that differ.

6. The one or more non-transitory computer-readable storage media of claim 5, wherein the layer-wise delta is singular value decomposition (SVD)-compressed and INT8-quantized before transmission, thereby shortening replication time for subsequent requests.

7. The one or more non-transitory computer-readable storage media of claim 1, further storing instructions that replicate model weight and/or configuration update triggered while routing the inference request, the replication being enforced under (i) strong consistency for model weight data and (ii) eventual or causal consistency for non-critical analytics data generated by the inference request.

8. The one or more non-transitory computer-readable storage media of claim 1, further storing instructions that capture a conversation state of the inference request and replicate the conversation state to another compute cluster in parallel with the inference to enable a seamless mid-conversation failover.

9. The one or more non-transitory computer-readable storage media of claim 1, further storing instructions that, for requests originating from autonomous AI agents, map each agent to a backup compute cluster and pre-stage agent state so that the inference request can be re-issued from the backup compute cluster without data loss.

10. The one or more non-transitory computer-readable storage media of claim 1, wherein every model weight replicated during fulfillment of the inference request is cryptographically signed and appended to a distributed ledger, providing a tamper-evident audit trail for the inference request.

11. A method for responding to an inference request, the method comprising:

identifying, for an inference request from a user, at least two geographically separate compute clusters configured to handle the inference request, each compute cluster storing a version of an artificial intelligence model for processing the inference request;

determining, from the inference request, a data consistency requirement that maps the inference request to one or more data consistency types;

determining, for each compute cluster, a composite metric based on a network latency to the compute cluster, a capacity of the compute cluster, and a consistency freshness score of the compute cluster;

routing the inference request to the compute cluster having a lowest composite metric subject to a constraint that the consistency freshness score for the compute cluster satisfies the data consistency requirement for the inference request; and returning an inference response for the inference request to the user.

12. The method of claim 11, wherein the consistency freshness score of the compute cluster for conversation state is computed as a vector clock divergence value, and wherein determining the composite metric for the compute cluster comprises penalizing the composite metric for the compute cluster proportional to the vector clock divergence value.

13. The method of claim 11, wherein one or more analytics records generated by the inference request are tagged for asynchronous replication, and wherein determining the composite metric for the compute cluster excludes the consistency freshness score for analytics data, thereby favoring lower latency compute clusters.

14. The method of claim 11, wherein a session affinity token accompanies the inference request, and wherein determining the composite metric comprises penalizing the composite metric for the compute cluster that does not hold a most recent user profile version linked to the session affinity token.

15. The method of claim 11, wherein routing the inference request further comprises computing a layer-wise delta between an updated model checkpoint and its previously replicated state and transmitting only those model weights that differ.

16. The method of claim 15, wherein the layer-wise delta is singular value decomposition (SVD)-compressed and INT8-quantized before transmission, thereby shortening replication time for subsequent requests.

17. The method of claim 11, further comprising replicating model weight and/or configuration update triggered while routing the inference request, the replication being enforced under (i) strong consistency for model weight data and (ii) eventual or causal consistency for non-critical analytics data generated by the inference request.

18. The method of claim 11, further comprising capturing a conversation state of the inference request and replicating the conversation state to another compute cluster in parallel with the inference to enable a seamless mid-conversation failover.

19. The method of claim 11, further comprising, for requests originating from autonomous AI agents, mapping each agent to a backup compute cluster and pre-staging agent state so that the inference request can be re-issued from the backup compute cluster without data loss.

20. A system comprising at least one processor and one or more non-transitory computer-readable media having instructions stored thereon that, when executed by the at least one processor, cause the at least one processor to perform operations comprising:

identifying, for an inference request from a user, at least two geographically separate compute clusters configured to handle the inference request;

determining, from the inference request, a data consistency requirement that maps the inference request to one or more data consistency types;

determining, for each compute cluster, a composite metric based on at least a consistency freshness score of the compute cluster;

routing the inference request to the compute cluster having a lowest composite metric subject to a constraint that the consistency freshness score for the compute cluster satisfies the data consistency requirement for the inference request; and returning an inference response for the inference request to the user.

\* \* \* \* \*